(12) United States Patent
Glugla et al.

(10) Patent No.: US 10,302,063 B2
(45) Date of Patent: May 28, 2019

(54) METHOD AND SYSTEM FOR IGNITION CONTROL

(71) Applicant: Ford Global Technologies, LLC, Dearborn, MI (US)

(72) Inventors: Chris Paul Glugla, Macomb, MI (US); Nelson William Morrow, Saline, MI (US); Garlan J. Huberts, Milford, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 971 days.

(21) Appl. No.: 14/814,289

(22) Filed: Jul. 30, 2015

(65) Prior Publication Data

US 2017/0030321 A1    Feb. 2, 2017

(51) Int. Cl.
| | | |
|---|---|---|
| *F02P 5/00* | (2006.01) | |
| *F02P 5/145* | (2006.01) | |
| *F02P 5/152* | (2006.01) | |
| *F02P 5/15* | (2006.01) | |
| *F02P 11/06* | (2006.01) | |
| *F02P 17/00* | (2006.01) | |
| *F02P 17/12* | (2006.01) | |

(52) U.S. Cl.
CPC ............. *F02P 5/1455* (2013.01); *F02P 5/152* (2013.01); *F02P 5/1512* (2013.01); *F02P 5/1522* (2013.01); *F02P 11/06* (2013.01); *F02P 17/00* (2013.01); *F02P 2017/125* (2013.01); *Y02T 10/46* (2013.01)

(58) Field of Classification Search
CPC .............. F02D 37/02; F02P 5/00; F02P 5/145
USPC ............ 123/406.11, 406.12, 406.23, 406.25, 123/406.28, 406.41, 406.45, 406.46, 123/406.53–406.55
See application file for complete search history.

(56) References Cited

U.S. PATENT DOCUMENTS

| | | | |
|---|---|---|---|
| 3,788,290 A * | 1/1974 | Carter | F02P 5/103 123/406.67 |
| 6,505,605 B2 | 1/2003 | Yamada et al. | |
| 7,255,088 B2 | 8/2007 | Nakamura et al. | |
| 8,132,556 B2 | 3/2012 | Glugla et al. | |
| 2017/0356359 A1* | 12/2017 | Glugla | F02D 41/221 |
| 2018/0119665 A1* | 5/2018 | Glugla | F02P 9/00 |

* cited by examiner

*Primary Examiner* — John Kwon
(74) *Attorney, Agent, or Firm* — Julia Voutyras; McCoy Russell LLP (57) ABSTRACT

Methods and systems are provided for addressing spark plug soot fouling. In one example, a method may include alternating one or more combustion events with spark timing advanced with one or more combustion events with nominal spark timing. The approach allows spark plug over-heating, and related issues such as knock, to be reduced.

18 Claims, 6 Drawing Sheets

METHOD AND SYSTEM FOR IGNITION CONTROL

FIELD

The present description relates generally to methods and systems for controlling a vehicle engine responsive to spark plug fouling.

BACKGROUND/SUMMARY

Engine ignition systems may include a spark plug for delivering an electric current to a combustion chamber of a spark-ignited engine to ignite an air-fuel mixture and initiate combustion. Based on engine operating conditions, spark plug fouling can occur wherein a firing tip of the spark plug insulator becomes coated with a foreign substance, such as fuel, oil, or soot. Once fouled, the spark plug may be unable to provide adequate voltage to trigger cylinder combustion until the spark plug is sufficiently cleaned or replaced. For example, the spark plug may be cleaned by burning off the soot accumulated on the fouled spark plug by operating the engine in speed-load conditions that sufficiently raise the spark plug tip temperature.

In modern boosted engine systems, which have a large dynamic operating range, a heat range for spark plugs is selected to avoid abnormal combustion events, such as pre-ignition, at wide open throttle and high engine speed conditions. In particular, the spark plugs selected are typically a low heat range plug to avoid pre-ignition at high engine speed and load conditions. Consequently, even if engine spends more time at high speed and load conditions than a normally aspirated engine, the spark plugs still do not get warm enough to trigger pre-ignition. However, for the same reason, the spark plugs also do not get warm enough to burn off soot deposits. Other attempts to address the spark plug fouling issue include advancing spark timing to burn off the deposits over the spark plug. One example approach is shown by Yamada et al. in U.S. Pat. No. 6,505,605. Therein, in response to spark plug fouling, spark timing is advanced for a number of combustion events, the amount of spark advance supplied adjusted based on an indicated mean effective pressure of the cylinder. In addition, to reduce further spark plug fouling, fueling to the affected cylinder is adjusted to provide a leaner air-fuel mixture. The spark timing advance and fueling adjustment is maintained until soot is burned off from the fouled spark plug, after which nominal fueling and spark timing is resumed.

However, the inventors herein have recognized potential issues with such approaches. As one example, the continued advancement of spark timing in '605 may induce engine knocking. That is, if spark timing is maintained advanced to raise the spark plug tip temperature and burn off the soot, the elevated temperature may trigger cylinder knock events. On the other hand, if spark timing is not sufficiently advanced, and the spark plug tip temperature not sufficiently raised, the spark plug may remain soot fouled, leading to cylinder misfire events. In addition, the engine controller may be conflicted between advancing spark timing to address spark plug fouling and retarding spark timing to address knock. Further still, the prolonged advancing of spark timing may affect engine fuel efficiency and exhaust emissions.

In one example, the issues described above may be at least partly addressed by a method for addressing spark plug fouling by periodically advancing spark timing and interspersing bursts of spark timing advance with operation at nominal spark timing. One example method comprises: supplying a first advanced spark timing to a cylinder for a first single combustion event; supplying a nominal spark timing to the cylinder for a predetermined number of combustion events after supplying the first advanced spark timing to the cylinder; and supplying a second advanced spark timing to the cylinder for a second single combustion cycle after the predetermined number of combustion events. In this way, soot deposits on a fouled spark plug may be burnt off with reduced propensity for inducing knock.

In one example, spark plug soot fouling may be determined based on the output of an ionization sensor. In response to the indication of spark plug fouling, a first advanced spark timing may be supplied to the affected cylinder for at least one combustion cycle. For example, the degree of spark timing advance applied and the number of combustion events the first spark timing advance is applied for may be adjusted to sufficiently raise the spark plug tip temperature to a temperature that enables soot burn-off. For example, spark timing may be advanced for only a single combustion event. Then, spark timing may be returned to a nominal spark timing (e.g., MBT or borderline spark timing) for a predetermined number of combustion events. The predetermined number may be adjusted to prevent overheating of the spark plug tip temperature, and induction of knock events. Then, a second advanced spark timing may be supplied to the cylinder for one or more combustion events. Herein, the second advanced spark timing may be adjusted (e.g., in real-time) based on ionization sensor output following the applying of the first advanced spark timing (and the nominal timing). For example, based on the ionization sensor output, a soot load remaining on the fouled spark plug may be inferred and a margin to knock may be determined. A degree of spark timing advance applied and the number of combustion events the second spark timing advance is applied for may then be adjusted to burn off the remaining soot while reducing a propensity, and intensity, of knock. The spark timing may then be returned to the nominal spark timing. In one example, since a portion of the soot load may have been burned off when the first advanced spark timing is applied, the second advanced spark timing may be less advanced than the first advanced spark timing.

The technical effect of supplying a nominal spark timing in-between the applying of a first and a second advanced spark timing is that overheating of the spark plug may be reduced. As such, this reduces the likelihood of knock being induced when using spark timing advance to burn off soot accumulated on a fouled spark plug. By using periodic advanced spark events with intermediate nominal events, spark plug tip temperatures may be raised sufficiently high to burn off soot (and address spark plug fouling) but not raised so high that overheating issues arise, such as knock, NVH, and durability constraints. By improving the engine's knock margin, the amount of spark timing advance that may be applied to burn off the soot can also be enhanced. By improving spark plug fouling control, the likelihood of misfires is reduced. In addition, spark plug temperatures may be controlled, reducing the likelihood of knock events. Overall, spark plug health and life can be improved.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
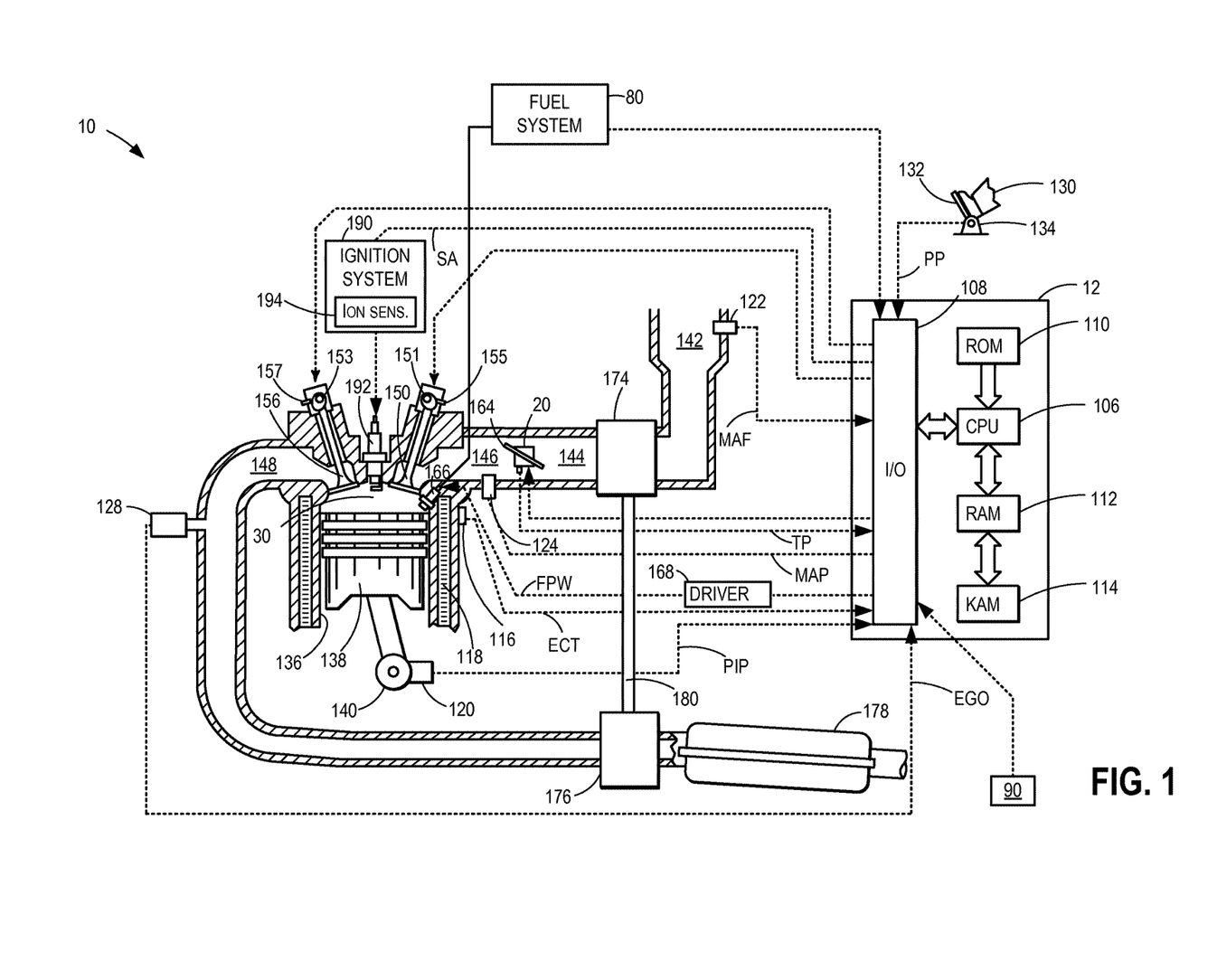
FIG. 1 shows a schematic diagram of an internal combustion engine.
Figure 3:
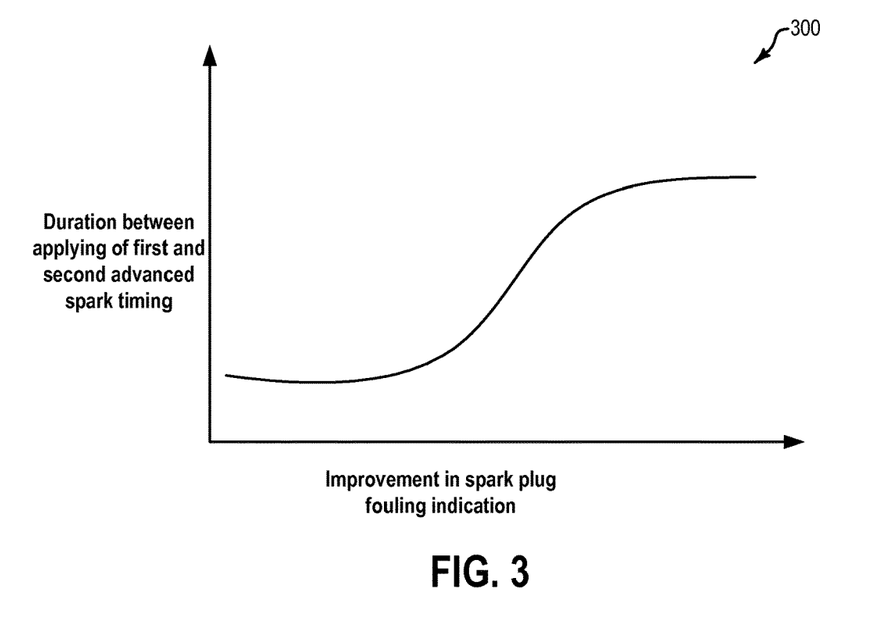
FIGS. 3-4 show example relations between a duration of engine operation with nominal timing and a spark plug fouling indicator, as well as between a degree of spark advance applied and the spark plug fouling indicator.
Figure 4:
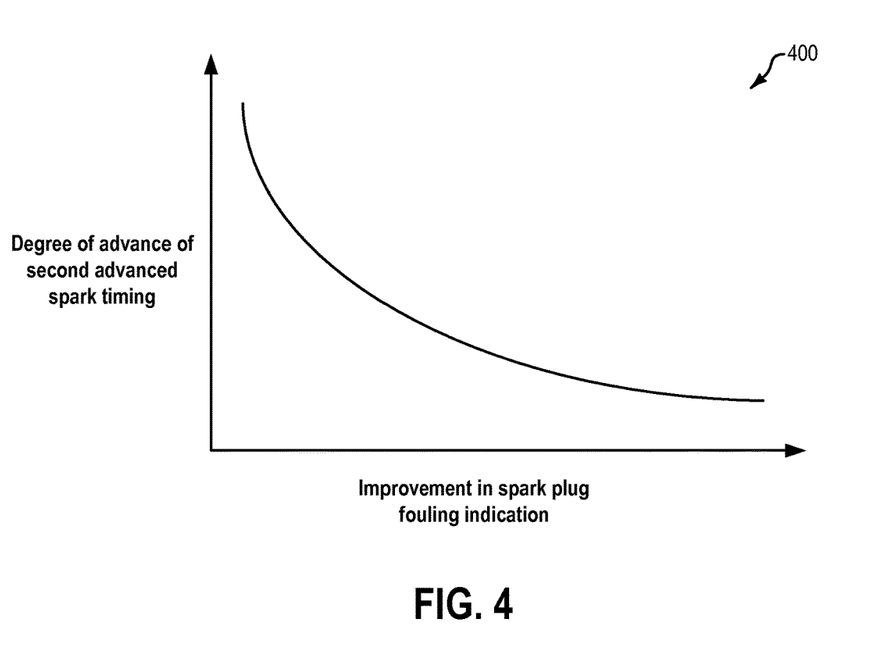

The following description relates to systems and methods for addressing spark plug fouling in an engine system, such as the engine system of FIG. 1, without overheating the spark plug. An engine controller may be configured to perform a control routine, such as the routine of FIG. 2, in response to a spark plug fouling event to burn off soot accumulating on the spark plug without inducing knock. Therein, the controller may alternate cylinder operation with spark advance and cylinder operation with nominal spark until the spark plug fouling has been addressed. A degree of spark advance applied, as well as a duration of operation with nominal spark elapsed between successive cylinder events with spark advance, may be adjusted based on an improvement in the indication of spark plug fouling, such as determined based on the output of an ion sensor (FIGS. 3-4). Example spark timing adjustments are shown with reference to FIGS. 5-7. In this way, spark plug fouling can be better addressed without incurring knock.

FIG. 1 is a schematic diagram showing one cylinder of multi-cylinder engine 10, which may be included in a propulsion system of an automobile. Engine 10 may be controlled at least partially by a control system including controller 12 and by input from a vehicle operator 130 via an input device 132. In this example, input device 132 includes an accelerator pedal and a pedal position sensor 134 for generating a proportional pedal position signal PP. Combustion chamber (i.e. cylinder) 30 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of a vehicle via an intermediate transmission system. Further, a starter motor may be coupled to crankshaft 140 via a flywheel to enable a starting operation of engine 10.

Cylinder 30 can receive intake air via a series of intake air passages 142, 144, and 146. Intake air passage 146 can communicate with other cylinders of engine 10 in addition to cylinder 30. In some embodiments, one or more of the intake passages may include a boosting device such as a turbocharger or a supercharger. For example, FIG. 1 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 20 including a throttle plate 164 may be provided along an intake passage of the engine for varying the flow rate and/or pressure of intake air provided to the engine cylinders. For example, throttle 20 may be disposed downstream of compressor 174 as shown in FIG. 1, or alternatively may be provided upstream of compressor 174.

Exhaust passage 148 can receive exhaust gases from other cylinders of engine 10 in addition to cylinder 30. In one example, exhaust passage 148 may receive exhaust from all the cylinders of engine 10. However, in some embodiments, as elaborated at FIG. 2, the exhaust from one or more cylinders may be routed to a first exhaust passage, while the exhaust from one or more other (remaining) cylinders may be routed to a second, different exhaust passage, the distinct exhaust passages then converging further downstream, at or beyond an exhaust emission control device. Exhaust gas sensor 128 is shown coupled to exhaust passage 148 upstream of emission control device 178. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three way catalyst (TWC), NOx trap, various other emission control devices, or combinations thereof.

Exhaust temperature may be estimated by one or more temperature sensors (not shown) located in exhaust passage 148. Alternatively, exhaust temperature may be inferred based on engine operating conditions such as speed, load, air-fuel ratio (AFR), spark retard, etc. Further, exhaust temperature may be computed by one or more exhaust gas sensors 128. It may be appreciated that the exhaust gas temperature may alternatively be estimated by any combination of temperature estimation methods listed herein.

Each cylinder of engine 10 may include one or more intake valves and one or more exhaust valves. For example, cylinder 30 is shown including at least one intake poppet valve 150 and at least one exhaust poppet valve 156 located at an upper region of cylinder 30. In some embodiments, each cylinder of engine 10, including cylinder 30, may include at least two intake poppet valves and at least two exhaust poppet valves located at an upper region of the cylinder. Intake valve 150 may be controlled by controller 12 by cam actuation via cam actuation system 151. Similarly, exhaust valve 156 may be controlled by controller 12 via cam actuation system 153. Cam actuation systems 151 and 153 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 150 and exhaust valve 156 may be determined by valve position sensors 155 and 157, respectively. In alternative embodiments, the intake and/or exhaust valve may be controlled by electric valve actuation. For example, cylinder 30 may alternatively include an intake valve controlled via electric valve actuation and an exhaust valve controlled via cam actuation including CPS and/or VCT systems. In still other embodiments, the intake and exhaust valves may be controlled by a common valve actuator or actuation system, or a variable valve timing actuator or actuation system.

Cylinder 30 can have a compression ratio, which is the ratio of volumes when piston 138 is at bottom center to top center. Conventionally, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

Each cylinder of engine 10 may include a spark plug 192 for initiating combustion. Ignition system 190 can provide an ignition spark to combustion chamber 30 via spark plug 192 in response to spark advance signal SA from controller 12, under select operating modes. In particular, in response to the spark signal from the controller, ignition system 190 may apply a high-voltage bias across spark plug 192 to enable ionization sensing. The high-voltage bias may be applied across the spark gap and may be applied prior to ignition coil dwell. During selected conditions, an additional high-voltage bias may be applied during ignition coil dwell. Ignition system 190 may include one or more ignition coils and other circuitry/electronics to actuate the associated spark plug, and provide ion sensing, such as an ion sensing module 194. Ion sensing module may include an ion sensor. Alternatively, the spark plug may be used for ion sensing. Charging of the ignition coil may be powered by a high-voltage power supply (not shown) or by battery voltage. Use of a boosted voltage provided by a high-voltage power supply may provide various advantages, such as reducing ignition coil charge time and dwell time, which generally allows greater ignition timing flexibility and/or a longer ionization sensing period.

In one embodiment, each spark plug includes a dedicated coil and associated electronics to provide sparking and ion sensing. Alternatively, a single ignition module may be associated with multiple spark plugs with ionization sensing provided using a power pair arrangement to reduce the number of necessary control lines. The depicted embodiment illustrates a single spark plug in each cylinder that functions to ignite the fuel mixture. However, the present disclosure may be used in applications that use dual spark plugs with one or both providing mixture ignition and/or ion sensing.

Controller 12 may include code implemented by software and/or hardware to monitor an ionization current of the spark plug to detect a spark plug fouling condition. As discussed further below with reference to FIGS. 2-4, in response to the spark plug fouling condition, controller 12 may employ various corrective actions or control procedures to burn off soot deposited on the fouled spark plug. Control procedures to remove spark plug deposits include periodic advancing of ignition timing, the period spark advance events interspersed with nominal spark events. The spark advance event(s) is used to quickly transfer heat to the spark plug, thereby raising the spark plug tip temperature and burning off accumulated soot. The intermittent nominal spark event(s) is used to control spark plug tip temperature and reduce overheating, thereby reducing knock, NVH, and spark plug durability concerns.

In some embodiments, each cylinder of engine 10 may be configured with one or more fuel injectors for providing fuel thereto. As a non-limiting example, cylinder 30 is shown including one fuel injector 166. Fuel injector 166 is shown coupled directly to cylinder 30 for injecting fuel directly therein in proportion to the pulse width of signal FPW received from controller 12 via electronic driver 168. In this manner, fuel injector 166 provides what is known as direct injection (hereafter also referred to as "DI") of fuel into combustion cylinder 30. While FIG. 1 shows injector 166 as a side injector, it may also be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing. It will be appreciated that, in an alternate embodiment, injector 166 may be a port injector providing fuel into the intake port upstream of cylinder 30.

It will be appreciated that in still further embodiments, the engine may be operated by injecting a variable fuel blend or knock/pre-ignition suppressing fluid via two injectors (a direct injector 166 and a port injector) and varying a relative amount of injection from each injector.

Fuel may be delivered to fuel injector 166 via a high pressure fuel system 80, including fuel tanks, fuel pumps, and a fuel rail. Alternatively, fuel may be delivered by a single stage fuel pump at lower pressure, in which case the timing of the direct fuel injection may be more limited during the compression stroke than if a high pressure fuel system is used. Further, while not shown, the fuel tanks may have a pressure transducer providing a signal to controller 12.

Fuel may be delivered by the injector(s) to the cylinder during a single engine cycle of the cylinder. Further, the distribution and/or relative amount of fuel delivered from the injector(s) may vary with operating conditions. For example, the distribution may vary with a rate of change of a cylinder aircharge, a nature of an abnormal cylinder combustion event (such as, whether there is a cylinder misfire event, knock event, or pre-ignition event). Furthermore, for a single combustion event, multiple injections of the delivered fuel may be performed per cycle. The multiple injections may be performed during the compression stroke, intake stroke, or any appropriate combination thereof.

As described above, FIG. 1 shows only one cylinder of a multi-cylinder engine. As such each cylinder may similarly include its own set of intake/exhaust valves, fuel injector(s), spark plug, etc.

Fuel tanks in fuel system 80 may hold fuel or knock/pre-ignition suppressing fluids with different qualities, such as different compositions. These differences may include different alcohol content, different water content, different octane, different heat of vaporizations, different fuel blends, and/or combinations thereof etc. In one example, fuels or knock/pre-ignition suppressing fluids with different alcohol contents could include one fuel being gasoline and the other being ethanol or methanol. In another example, the engine may use gasoline as a first substance and an alcohol containing fuel blend such as E85 (which is approximately 85% ethanol and 15% gasoline) or M85 (which is approximately 85% methanol and 15% gasoline) as a second substance. Other alcohol containing fuels could be a mixture of alcohol and water, a mixture of alcohol, water and gasoline etc. In still another example, both fuels may be alcohol blends wherein the first fuel may be a gasoline alcohol blend with a lower ratio of alcohol than a gasoline alcohol blend of a second fuel with a greater ratio of alcohol, such as E10 (which is approximately 10% ethanol) as a first fuel and E85 (which is approximately 85% ethanol) as a second fuel. In yet another example, one of the fluids may include water while the other fluid is gasoline or an alcohol blend. Additionally, the first and second fuels may also differ in other fuel qualities such as a difference in temperature, viscosity, octane number, latent enthalpy of vaporization etc. Still other pre-ignition suppressing fluids may include water, methanol, washer fluid (which is a mixture of approximately 60% water and 40% methanol), etc.

Moreover, fuel characteristics of the fuel or pre-ignition suppressing fluid stored in the fuel tank may vary frequently.

In one example, a driver may refill the fuel tank with E85 one day, and E10 the next, and E50 the next. The day to day variations in tank refilling can thus result in frequently varying fuel compositions, thereby affecting the fuel composition delivered by injector 166.

Engine 10 may further include one (as depicted) or more knock sensors 90 distributed along a body of the engine (e.g., along an engine block). When included, the plurality of knock sensors may be distributed symmetrically or asymmetrically along the engine block. Knock sensor 90 may be an accelerometer, an ionization sensor, or a vibration sensor. In one example, the controller 12 may be configured to detect and differentiate engine block vibrations generated due knocking from those due to pre-ignition based on the output (e.g., signal timing, amplitude, intensity, frequency, etc.) of the one or more knock sensors 90. The controller may assess the sensor outputs in different timing windows that are cylinder specific and that are based on the nature of the vibration being detected. For example, knock may be identified by knock sensor outputs sensed in a crank angle window that is after ignition, while pre-ignition may be sensed in a crank angle window that is before ignition. As another example, knock may be indicated in response to knock sensor output in the later window being above a knock threshold, while pre-ignition may be indicated in response to knock sensor output in the earlier window being above a pre-ignition threshold, the pre-ignition threshold larger than the knock threshold.

In further examples, the controller 12 may be configured to detect and differentiate the origin of the vibrations based on the output (e.g., signal timing, amplitude, intensity, frequency, etc.) of the one or more knock sensors as well as a rate of change of a parameter indicative of a cylinder aircharge such as a rate of change of a manifold pressure (MAP), a manifold air flow (MAF), etc.

It will be appreciated that while FIG. 1 suggests using knock sensors to sense engine block vibrations, in alternate examples, other accelerometers, vibrations sensors, ionization sensors, or in-cylinder pressure sensors can be used to sense the vibrations. Further, the accelerometers, vibrations sensors, in-cylinder pressure sensors, and ionization sensors may also be used to indicate a cylinder misfire event (such as a cylinder misfire event triggered by spark plug fouling) and distinguish the misfire event from knock or pre-ignition events.

Controller 12 is shown in FIG. 1 as a microcomputer, including microprocessor unit 106, input/output ports 108, an electronic storage medium for executable programs and calibration values shown as read only memory chip 110 in this particular example, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; absolute manifold pressure signal (MAP) from sensor 124, cylinder AFR from EGO sensor 128, spark plug ionization current from an ionization sensor of ionization sensing module 194, and abnormal combustion from a knock sensor 90 and a crankshaft acceleration sensor. Engine speed signal, RPM, may be generated by controller 12 from signal PIP. Manifold pressure signal MAP from a manifold pressure sensor may be used to provide an indication of vacuum, or pressure, in the intake manifold. Still other sensors such as cylinder pressure sensors, knock sensors, and/or pre-ignition sensors may be coupled to engine 10 (e.g., to a body of the engine) to help in the identification of abnormal combustion events. The controller 12 receives signals from the various sensors of FIG. 1 and employs the various actuators of FIG. 1 to adjust engine operation based on the received signals and instructions stored on a memory of the controller. Storage medium read-only memory 110 can be programmed with computer readable data representing instructions executable by processor 106 for performing the methods described below as well as other variants that are anticipated but not specifically listed.

Figure 2:
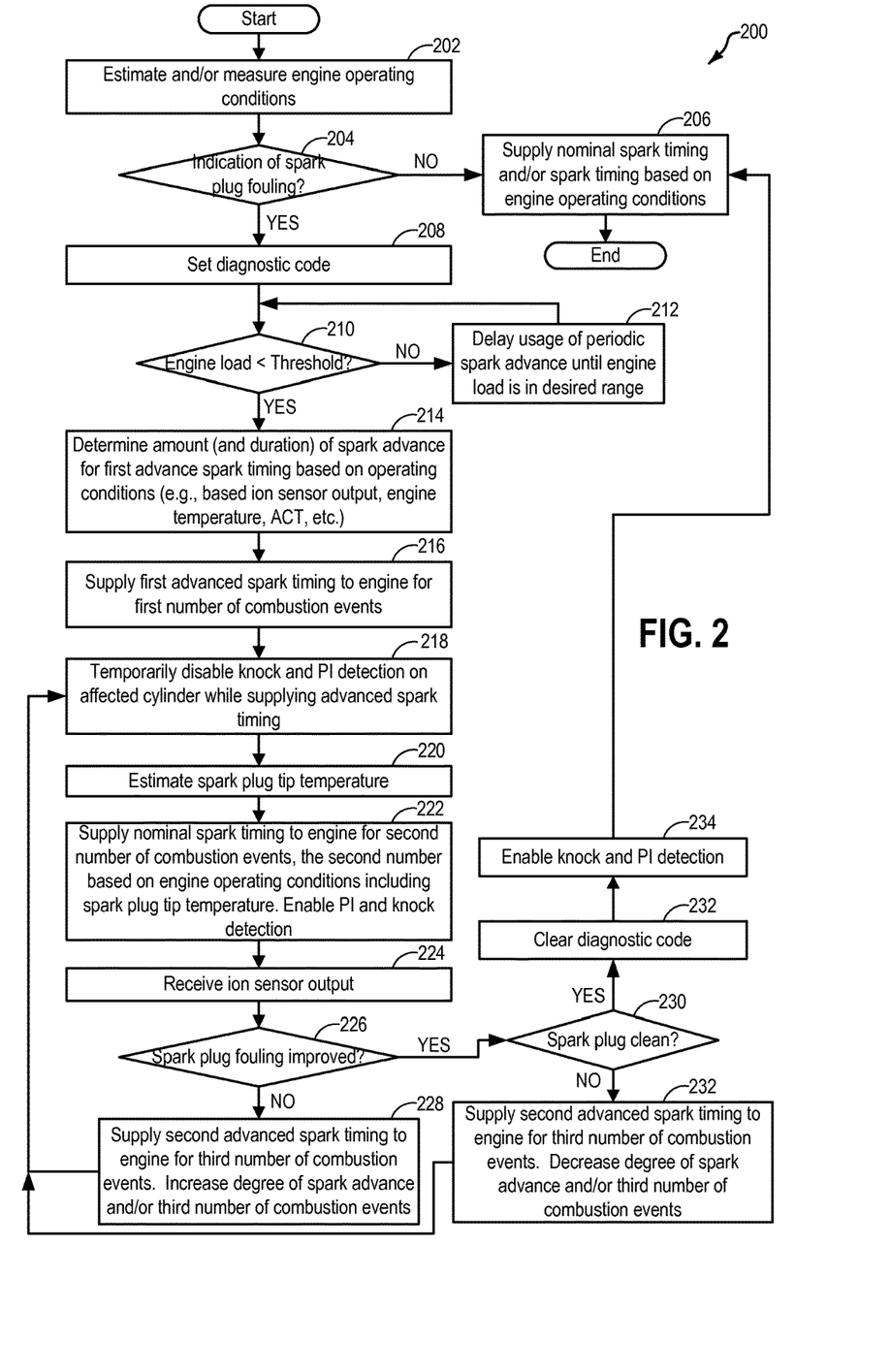
FIG. 2 shows a high level flow chart for intermittently modulating spark timing between an advanced timing and a nominal timing in response to spark plug fouling.

Now turning to FIG. 2, an example method 200 is described for periodically advancing spark timing from a nominal spark timing responsive to an indication of fouling of a spark plug. The periodic spark advance events are used to heat the spark plug enough to burn of accumulated soot. The periodic spark advance events are separated by interim nominal spark events that better enable spark plug tip temperature to be controlled. Instructions for carrying out method 200 and the rest of the methods included herein may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below.

At 202, the method includes estimating and/or measuring engine operating conditions. The conditions estimated may include, for example, engine speed, engine load, engine temperature, exhaust temperature, spark plug ionization current, knock sensor output, etc.

At 204, based on the estimated engine operating conditions, it may be determined if there is an indication of spark plug fouling. For example, spark plug fouling may be indicated based on the occurrence of one or more cylinder misfire events. In another example, spark plug fouling may be indicated based on the ionization current of the spark plug, or the output of an ion sensor coupled to the spark plug. For example, if the ionization current is higher than a threshold, spark plug fouling due to soot accumulation may be determined. As such, a steady-state ionization signal (e.g., current) prior to energization of the ignition coil of the spark plug, also referred to as the pre-dwell phase, exceeds the threshold. The pre-dwell ionization signal provides a measurement of the shunt resistance, which reduces as conductive carbon-containing deposits (soot) form on the spark plug. If the ionization current is higher than the threshold, it indicates an elevated shunt resistance due to spark plug fouling.

If there is no indication of spark plug fouling, at 206, the method includes maintaining engine operation with a nominal spark timing (or an alternate spark timing based on engine operating conditions). For example, spark timing may be maintained at or around MBT or borderline timing (BDL).

If there is an indication of spark plug fouling, the method includes setting a diagnostic code at 208. The diagnostic code indicates that the spark plug is fouled due to soot accumulation and that the soot needs to be burned off. As such, the diagnostic code may be maintained until the spark plug is sufficiently cleaned. As elaborated below, the spark plug may be cleaned by periodically advancing spark timing from a nominal spark timing, then resuming nominal spark timing.

At 210, before initiating spark plug cleaning, it may be determined if the engine load is below a threshold load. Specifically, it may be determined that the engine is operating below a maximum load or maximum torque output. For example, it may be determined that the engine is operating at less than wide open throttle (WOT). By performing the spark plug cleaning using periodic spark advance events during less loaded engine conditions (that is, during low to moderate load levels), engine damage due to spark plug overheating, knock, pre-ignition, and/or NVH may be reduced. If the engine load is at or above the threshold load, at 212, the spark plug cleaning using periodic spark advance may be delayed until the engine load is in the desired load range.

Upon confirming that the engine load is in the desired range, a spark plug cleaning routine is initiated. Specifically, at 214, the method includes determining an amount and duration of spark advance for a first advanced spark timing based on engine operating conditions including one or more (or each) of ion sensor output, engine temperature, engine load, EGR percentage, humidity, fuel octane, air-fuel ratio, and air charge temperature. For example, as the ion sensor output rises above the threshold (and the indication of spark plug fouling indicates a higher level of soot on the fouled spark plug), the amount (or degree) of spark advance applied may be increased. Additionally or optionally, spark advance may be applied for a first number of combustion events. As another example, at lighter engine loads, where the engine is not borderline limited, spark timing may be advanced of MBT timing. In comparison if the engine is borderline limited, the amount of spark retard applied may be lower than that at a lightly loaded condition. In another example, as the air charge temperature creases, the degree of spark advance for a first advanced spark event may be decreased. As yet another example, as the engine temperature increases, the degree of spark advance for a first advanced spark event may be decreased. As still another example, as an amount (or percentage) of EGR used in the engine increases (that is, as engine dilution increases), the degree of spark advance for a first advanced spark event may be increased. As yet another example, as an inferred fuel octane or charge humidity (e.g., ambient humidity) of the engine increases the degree of spark advance for a first advanced spark event may be increased. Further stilt, the degree of spark advance may be adjusted based on whether the engine is borderline spark limited or not, and further based on how far the engine is limited from borderline spark. As such, the amount and number of initial advanced spark events may be selected so as to sufficiently raise a spark plug tip temperature to a level that enables a significant portion of the accumulated soot to be burnt off.

In some examples, an ion sense signal may be used to indicate or infer an amount of heat in the spark plug. Further, as discussed below, it may be possible to estimate a rise in spark plug tip temperature with the ion signal, which may then be used as a feedback mechanism to vary the degree of spark advance and the number of combustion events of applying the first advanced spark timing (and/or the subsequent nominal spark timing).

The degree of spark advance applied may also be adjusted based on a knock or pre-ignition history of the engine, as indicated by the engine's pre-ignition and/or knock count. For example, if the engine has a higher knock or pre-ignition count, it may be determined that the engine has a higher propensity for knock or pre-ignition. Accordingly, to reduce the likelihood of inducing knock and/or pre-ignition while cleaning the spark plug, the degree of spark advance for a first advanced spark event may be decreased and/or a number of initial spark advance events applied may be reduced. Furthermore, if the engine were knocking or pre-igniting, it would put more heat into the spark plug naturally. Therefore, the amount of advanced spark timing required to raise the spark plug tip temperature would be lower.

At 216, the method includes supplying a first advanced spark timing to the spark plug fouling affected cylinder for (at least) a first single combustion event with the amount or degree of spark advance determined at 214. Herein the supplying is performed is responsive to the indication of spark plug fouling due to soot accumulation. In some examples, the method may further include advancing spark timing for one or more combustion events after the first single combustion event. The number of the one or more combustion cycles may be based on the indication of spark plug fouling, as determined at 214. In addition, the one or more combustion cycles may be based on a spark plug tip temperature. For example, if the spark plug tip temperature is not sufficiently raised after supplying the first advanced spark timing for the first single combustion event, the number of spark advance events may be increased. In one example, the controller may supply the first advanced spark timing to the affected cylinder for a first single combustion event, and then extend the first advanced spark timing to one or more cylinders for one or more combustion cycles in real-time based on a spark plug tip temperature estimated or measured at or immediately after the first advanced spark timing is supplied. In other words, the first advanced spark timing may be supplied for a first number of combustion events.

At 218, while supplying the first advanced spark timing and performing the periodic use of advanced spark, knock and pre-ignition detection may be temporarily disabled for the affected cylinder. As such, knock and pre-ignition detection (and mitigation) may be maintained for remaining engine cylinders. For example, the output of a knock sensor may be temporarily disregarded even if it is higher than a knock or a pre-ignition threshold. Alternatively, the knock and pre-ignition detection may be allowed but knock and pre-ignition mitigation may be temporarily disabled. For example, even if a knock sensor output is higher than a knock threshold, spark retard may not be applied to address the knock for a duration while the periodic spark advance is being supplied. Likewise, even if a knock sensor output is higher than a pre-ignition threshold, cylinder enrichment may not be applied to address the pre-ignition for a duration while the periodic spark advance is being supplied. By temporarily disabling knock control while spark plug fouling is being addressed in a cylinder using periodic spark advance, conflicts at the controller between spark plug cleaning using spark advance, and knock mitigation using spark retard can be reduced. In other words, knock and pre-ignition control modules do not "fight" a spark plug cleaning module of the controller.

At 220, the method includes estimating or measuring a spark plug tip temperature. In addition, one or more other engine parameters may be measured or estimated such as engine temperature, aircharge temperature, exhaust temperature, etc. At 222, the method includes, after supplying the first advanced spark timing to the cylinder for the first single combustion event (or first number of combustion events), supplying nominal spark timing to the cylinder for a number of combustion events. Herein, nominal spark timing may be supplied for a second number of combustion events. The second number of combustion events over which the nominal spark timing is supplied may be based on at least the spark plug tip temperature. Further, the number of combustion events over which the nominal spark timing is supplied may be based on one or more of ionization sensor output, aircharge temperature, engine temperature, and spark plug tip temperature. The number may be adjusted in real-time, such as based on one or more (or each) of the ionization sensor output, aircharge temperature, engine temperature, EGR percentage (or EGR dilution), fuel octane, air-fuel ratio, and/or spark plug tip temperature estimated immediately after supplying the first advanced spark timing.

In particular, the number of combustion events may be adjusted to reduce overheating of the spark plug, and triggering of abnormal combustion events such as knock or pre-ignition due to the overheating. For example, as the spark plug tip temperature increases (e.g., increases above a threshold temperature after supplying the first advanced spark timing), the second number of combustion events over which the nominal timing is supplied may be increased. In alternate examples, in response to any of aircharge temperature, and engine temperature rising above respective thresholds, the duration of supplying nominal timing may be increased. While supplying nominal spark timing to the affected cylinder, knock and pre-ignition detection may be re-enabled. This allows knock or pre-ignition to be diagnosed in the affected cylinder. If a knock sensor output is higher than a pre-ignition threshold while the cylinder is supplied with nominal spark timing, cylinder enrichment may be applied to address the pre-ignition while the nominal spark timing is being supplied, or while supplying the second advanced spark timing (after the nominal spark timing). Herein, the enrichment is limited to the affected cylinder only and not extended to other engine cylinders. Likewise, if the knock sensor output is higher than a knock threshold while the cylinder is supplied with nominal spark timing, spark retard may be applied to address the knock. Alternatively, the degree of advance and number of combustion events for the second advanced spark timing may be adjusted (as discussed below).

At 224, ion sensor output may be received. Based on the ion sensor output, a soot level on the fouled spark plug may be inferred. For example, the soot load of the spark plug may be estimated based on the ionization current of the spark plug relative to a threshold.

At 226, based on the ion sensor output, it may be determined if the spark plug fouling has improved. In one example, it may be determined that spark plug fouling has improved if there is a drop in the estimated soot level of the fouled spark plug, as determined based on the ionization current of the affected spark plug. As an example, the most recent soot level estimation may be compared to the soot level estimated at the time of indicating spark plug fouling (at 204). If the most recent soot level estimate is lower than the initial estimate (or lower by more than a threshold amount), it may be determined that the spark plug fouling has improved.

If the most recent soot level estimate is not sufficiently lower than the initial estimate (e.g., lower by less than the threshold amount), it may be determined that the spark plug fouling has not improved. Accordingly, at 228, the method proceeds to supply a second advanced spark timing to the affected cylinder for at least a second single combustion event after supplying the nominal timing for a number of combustion events. In addition, the supplying of the second advanced spark timing may be extended for a third number of combustion events. Herein, the second advanced spark timing is less advanced (from the nominal spark timing) than the first advanced spark timing. By reducing the degree of advance of the second advanced spark timing relative to the first advanced spark timing, while separating the first and second advanced spark timing with a burst of nominal spark timing, spark plug tip temperature can be raised enough to burn off accumulated soot from the spark plug, without overheating the spark plug. In addition, while supplying the second advanced spark timing, knock and pre-ignition detection may be temporarily disabled (for the affected cylinder only), as discussed earlier at 218.

In response to the insufficient improvement in the addressing of spark plug fouling following the supplying of the first advanced spark timing, the degree of spark advance supplied at the second advanced spark timing as well as the third number of combustion events over which the second advanced spark timing is supplied may be adjusted, as elaborated with reference to the maps of FIGS. 3-4. For example, the degree of spark advance and/or the third number of combustion events may be adjusted in real-time based on one or more of ionization sensor output, aircharge temperature, spark plug tip temperature, and engine temperature estimated following the supplying of the first advanced spark tinting and the supplying of the nominal spark timing. In the depicted example, the degree of spark advance is increased (while maintaining the second advanced spark timing less advanced than the first advanced spark timing) and/or the third number of combustion events may be increased. That is, a more intense second pulse with more advanced spark timing may be applied and/or a longer second pulse of advanced spark timing may be applied. Further, a combination of a longer and more intense second pulse of spark advance may be supplied.

It will be appreciated that both the first and second advanced spark timing are advanced relative to the nominal spark timing. In one example, the nominal spark timing includes MBT and the first and second advanced spark timing are advanced from MBT. In another example, the nominal spark timing includes borderline timing (BDL) and the first and second advanced spark timing are advanced from BDL.

If the most recent soot level estimate is sufficiently lower than the initial estimate (e.g., lower by more than the threshold amount), the method moves to 230 to determine if the spark has been cleaned. That is, it may be determined if the spark plug soot level has been reduced below a level (e.g., a lower threshold) where misfires can occur. If the spark plug soot level has been reduced to or below the lower threshold (for example, where substantially all the soot has been burned off), then it may be determined that the spark plug is clean. However, if the most recent soot level estimate is sufficiently lower, but not yet at the lower threshold, it may be determined that the spark plug fouling has improved, but that the spark plug is not fully clean yet.

In response to the spark plug not being clean with an indication of an improvement in spark plug fouling, the method proceeds to supply a second advanced spark timing to the affected cylinder for at least a second single combustion event after supplying the nominal timing for a number of combustion events. In addition, the supplying of the second advanced spark timing may be extended for a third number of combustion events. Herein, the second advanced spark timing is less advanced (from the nominal spark timing) than the first advanced spark timing. By reducing the degree of advance of the second advanced spark timing relative to the first advanced spark timing, while separating the first and second advanced spark timing with a burst of nominal spark timing, spark plug tip temperature can be raised enough to burn off accumulated soot from the spark plug, without overheating the spark plug.

In response to sufficient improvement in the addressing of spark plug fouling following the supplying of the first advanced spark timing, the degree of spark advance supplied at the second advanced spark timing as well as the third number of combustion events over which the second advanced spark timing is supplied may be adjusted, as elaborated with reference to the maps of FIGS. 3-4. For example, the degree of spark advance and/or the third number of combustion events may be adjusted in real-time based on one or more of ionization sensor output, aircharge temperature, spark plug tip temperature, and engine temperature estimated following the supplying of the first advanced spark timing and the supplying of the nominal spark timing. In the depicted example, the degree of spark advance is decreased (while maintaining the second advanced spark timing less advanced than the first advanced spark timing) and/or the third number of combustion events may be decreased. That is, a less intense second pulse with less advanced spark timing may be applied, and/or a shorter second pulse of advanced spark timing may be applied. Further, a combination of a shorter and less intense second pulse of spark advance may be supplied.

Upon supplying the second advanced spark timing at 228 and 232, the routine returns to 220 wherein a spark plug tip temperature is estimated and accordingly a duration of supplying spark at nominal timing is adjusted. In addition, based on the ion sensor output a spark plug fouling improvement is reassessed and a further supplying of advanced spark timing is adjusted. In this way, engine operation with bursts of progressively less advanced spark timing may be interspersed with pulses of nominal spark timing to address soot fouling of a spark plug with improved spark plug temperature control. Herein, based on an improvement in the condition of the fouled spark plug following the use of a burst of spark advance, further bursts of spark advance are adjusted, as well as duration of nominal spark applied between the bursts is adjusted.

Returning to 230, if it is determined that the fouled spark plug is sufficiently clean (for example, if it determined that substantially all the soot has been burned off from the affected spark plug), then at 232, the method includes clearing the diagnostic code (previously set at 208) indicating spark plug fouling. In addition, at 234, knock and pre-ignition detection and mitigation is re-enabled. For example, knock and pre-ignition control modules of the engine controller are reactivated. The routine then moves to 206 wherein engine operation with nominal spark timing (or an alternate spark timing based on engine operating conditions) is resumed. For example, spark timing may be maintained at or around MET or borderline timing (BDL). As one example, in response to an indication of spark plug fouling, 1/50 events of a cylinder may have spark timing advanced 10-15 degrees from a nominal setting for 1 or more combustion events.

Alternatively, a number of combustion events may be supplied with advanced spark timing decreasing in a serial fashion. For example, 1/50 events of a cylinder may be subjected to 15, then 10, then 5 degrees of spark advance in a row to transfer sufficient heat to a plug. A similar scheme of supplying advanced spark timing may be deployed on different engine cylinders based on their respective indication of spark plug fouling until they have all been exercised enough to burn off or remove deposits while minimizing knock and NVH concerns, or having an adverse effect on durability.

In this way, responsive to an indication of fouling of a spark plug, a controller may periodically advance spark timing from a nominal spark timing, a degree of advance and a periodicity of the advanced spark timing based on one of more of an ionization sensor output, aircharge temperature, spark plug tip temperature and engine temperature. Herein, the periodic spark advance is maintained until the indication of fouling for the affected spark plug is addressed. It will be further appreciated that the periodic supplying of spark advance is performed for the affected cylinder in response to the indication of fouling of the given cylinder's spark plug, and not in response to an indication of fouling of an alternate cylinder's spark plug. Likewise, the periodic advance is not supplied to other unaffected cylinders.

FIG. 3 depicts an example relationship between a duration elapsed between the supplying of a first advanced spark timing and the supplying of a first advanced spark timing with relation to an estimated improvement in the indication of spark plug fouling. As discussed with reference to FIG. 2, an improvement in the indication of spark plug fouling may be determined based on a change in the inferred soot load of the spark plug, or based on the change in an ionization current of the spark plug. For example, a drop in the ionization current from an upper threshold may indicate spark plug soot fouling. Then, as the ionization current moves back towards the upper threshold following the supplying of at least a first advanced spark timing, an improvement in the indication of spark plug soot fouling may increase. As shown at map 300, as the improvement in the indication of spark plug fouling initially increases, a duration of supplying nominal spark timing between supplying a first and a second advanced spark timing may be maintained. Thereafter, as the improvement in the indication of spark plug fouling increases, a duration of supplying nominal spark timing between supplying a first and a second advanced spark timing may be increased. By supplying spark advance that is less subsequent and for lower durations (that is, with more spacing), the risk of knocking is reduced while supplying sufficient advanced spark timing to put in the additional heat required to clean the spark plug.

FIG. 4 depicts an example relationship between a degree of advance of a second advanced spark timing supplied after the supplying of each of a first advanced spark timing and a nominal spark timing in relation to an estimated improvement in the indication of spark plug fouling. As discussed with reference to FIG. 2, an improvement in the indication of spark plug fouling may be determined based on a change in the inferred soot load of the spark plug, or based on the change in an ionization current of the spark plug. For example, a drop in the ionization current from an upper threshold may indicate spark plug soot fouling. Then, as the ionization current moves back towards the upper threshold following the supplying of at least a first advanced spark timing, an improvement in the indication of spark plug soot fouling may increase. As shown at map 400 as the improvement in the indication of spark plug fouling initially increases, a degree of advance of the second advanced timing may be increased. Thereafter, as the improvement in the indication of spark plug fouling increases, the degree of spark advance for the second advanced timing may be decreased. By supplying spark advance that is less subsequent and for lower durations (that is, with more spacing), the risk of knocking is reduced while supplying sufficient advanced spark timing to put in the additional heat required to clean the spark plug.

Figure 5:
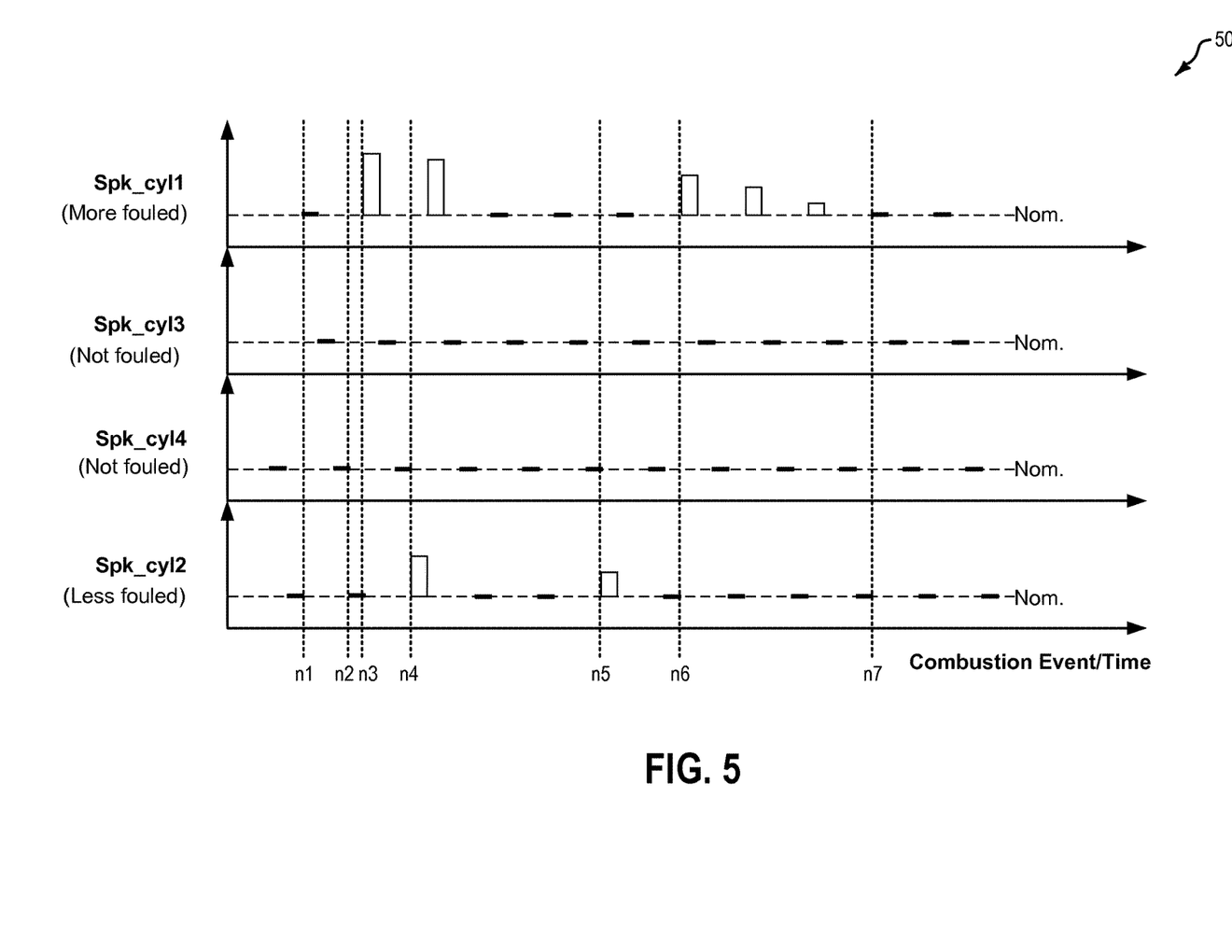
FIGS. 5-7 show example engine spark timing adjustments performed in response to a spark plug fouling event.

Turning now to FIG. 5, map 500 depicts an example spark timing map for all cylinders (Cyls_1 to 4) of an in-line 4 cylinder engine. In the depicted example, the four cylinders numbered 1-4 have firing order of 1-3-4-2. Changes in spark timing are shown with reference to a nominal timing (Nom.) depicted as a dashed line. In the depicted example, for a given combustion event, spark timing at nominal timing is represented by a single solid black bar aligned with the reference nominal timing (dashed line). For a given combustion event, spark timing advanced from nominal is represented by a single solid white bar above the reference nominal timing, a size of the bar corresponding to a degree of advance. Thus, a longer bar represents a more advanced spark timing. All spark timing adjustments are shown over time of engine operation, also indicated herein as a combustion event number. It will be appreciated that combustion events are described herein as n1, n2, etc., wherein n1 is a first combustion event introduced, n2 is a second combustion event introduced, etc. However, n1, n2, etc do not represent sequential combustion events in an engine firing order.

In the depicted example, the cylinders may all be initially firing in the depicted firing order (1-3-4-2) with spark timing at nominal timing. As one example, the nominal timing may be MBT. Following combustion event n1, in response to a rise in spark plug pre-dwell ionization current following the combustion event, it may be determined that the spark plug of Cyl_1 is soot fouled. Further, it may be determined that the spark plug of Cyl_1 is more severely fouled. Likewise, following combustion event n2, in response to a rise in spark plug pre-dwell ionization current following the combustion event, it may be determined that the spark plug of Cyl_2 is soot fouled. Further, it may be determined that the spark plug of Cyl_2 is less severely fouled (e.g., the amount of soot accumulated on Cyl_2 is less than that on Cyl_1). It may also be determined that the spark plugs of Cyl_3 and Cyl_4 are not fouled. Herein, measurement of background or pre-dwell ion current may provide advanced warning of fouling prior to occurrence of an actual misfire event. In alternate examples, the indication of spark plug fouling may be based on the incidence of cylinder misfire events.

In response to the indication of spark plug fouling at Cyl_1 (at combustion event n1), spark timing may be advanced on the very next combustion event in Cyl_1 (at combustion event n3). Specifically, a first advanced spark timing may be applied for a first number of combustion events in Cyl_1. In the depicted example, the first advanced spark timing is supplied for two combustion events before supplying nominal timing. In addition, the two combustion events may have progressively decreasing spark advance. In alternate examples, the two combustion events may have the same advanced spark timing. Herein, due to the higher severity of the soot fouling indication, a larger degree of spark advance is supplied for a larger number of combustion events to generate sufficient heat to burn off a significant portion of the soot accumulated on the spark plug of Cyl_1.

Following the supplying of the first advanced spark timing to Cyl_1, nominal timing is resumed for a second number of combustion events in Cyl_1 (herein, for three events). The transition to nominal timing is performed even though all the soot has not been burned off the fouled plug. By shifting to nominal timing for a duration, spark plug tip temperature may be controlled to reduce overheating and induction of knock or pre-ignition.

At n6, after supplying spark at nominal timing, another burst of spark advance is used to address the remaining soot on the fouled spark plug of Cyl_1. Herein, at no, a second advanced spark timing may be applied for a third number of combustion events in Cyl_1. In the depicted example, the second advanced spark timing is less advanced than the first advanced spark timing, and is supplied for three combustion events before resuming nominal timing. In addition, the three combustion events may have progressively decreasing spark advance. In alternate examples, the three combustion events may have the same advanced spark timing. Herein, due to the higher severity of the soot fouling indication, a relatively higher degree of spark advance is supplied for a larger number of combustion events to generate sufficient heat to burn off the remaining portion of the soot accumulated on the spark plug of Cyl_1. At n7, it may be determined than the spark plug of Cyl_1 is clean, and accordingly nominal spark timing is resumed.

In comparison, in response to the indication of spark plug fouling at Cyl_2 (at combustion event n2), spark timing may be advanced on the very next combustion event in Cyl_2 at combustion event n4). Specifically, a first advanced spark timing may be applied for a first number of combustion events in Cyl_2. In the depicted example, the first advanced spark timing supplied to Cyl_2 is less advanced than the first advanced spark timing supplied to Cyl_1 due to the lower intensity of spark plug fouling at Cyl_2. In this example, the first advanced spark timing is supplied for only one combustion event to Cyl_2 before supplying nominal timing. Herein, due to the lower severity of the soot fouling indication, a smaller degree of spark advance is supplied for a smaller number of combustion events.

Following the supplying of the first advanced spark timing to Cyl_2, nominal timing is resumed for a second number of combustion events in Cyl_2 (herein, for two events). The transition to nominal timing is performed even though all the soot has not been burned off the fouled plug. By shifting to nominal timing for a duration, spark plug tip temperature may be controlled to reduce overheating and induction of knock or pre-ignition.

At n6, after supplying spark at nominal timing, another burst of spark advance is used to address the remaining soot on the fouled spark plug of Cyl_2. Herein, at n6, a second advanced spark timing may be applied for a third number of combustion events in Cyl_2. In the depicted example the second advanced spark timing is less advanced than the first advanced spark timing, and is supplied for one combustion events before resuming nominal timing. Herein, due to the lower severity of the soot fouling indication, a relatively smaller degree of spark advance is supplied for a smaller number of combustion events to generate sufficient heat to burn off the remaining portion of the soot accumulated on the spark plug of Cyl_2. At n6, it may be determined than the spark plug of Cyl_2 is clean, and accordingly nominal spark timing is resumed.

While spark timing is advanced by different degrees and for different durations, and with different internals, in the fouling affected cylinders (Cyls. 1 and 2), the unaffected cylinders (Cyls. 3 and 4) may continue to be supplied nominal spark timing over the duration of engine operation.

In this way, by adjusting a degree of advance for an advanced spark timing, a duration of supplying the advanced timing, and an interval of nominal timing in between consecutive bursts of supplying spark timing advance, soot fouled spark plugs can be cleaned without overheating the spark plug.

Figure 6:
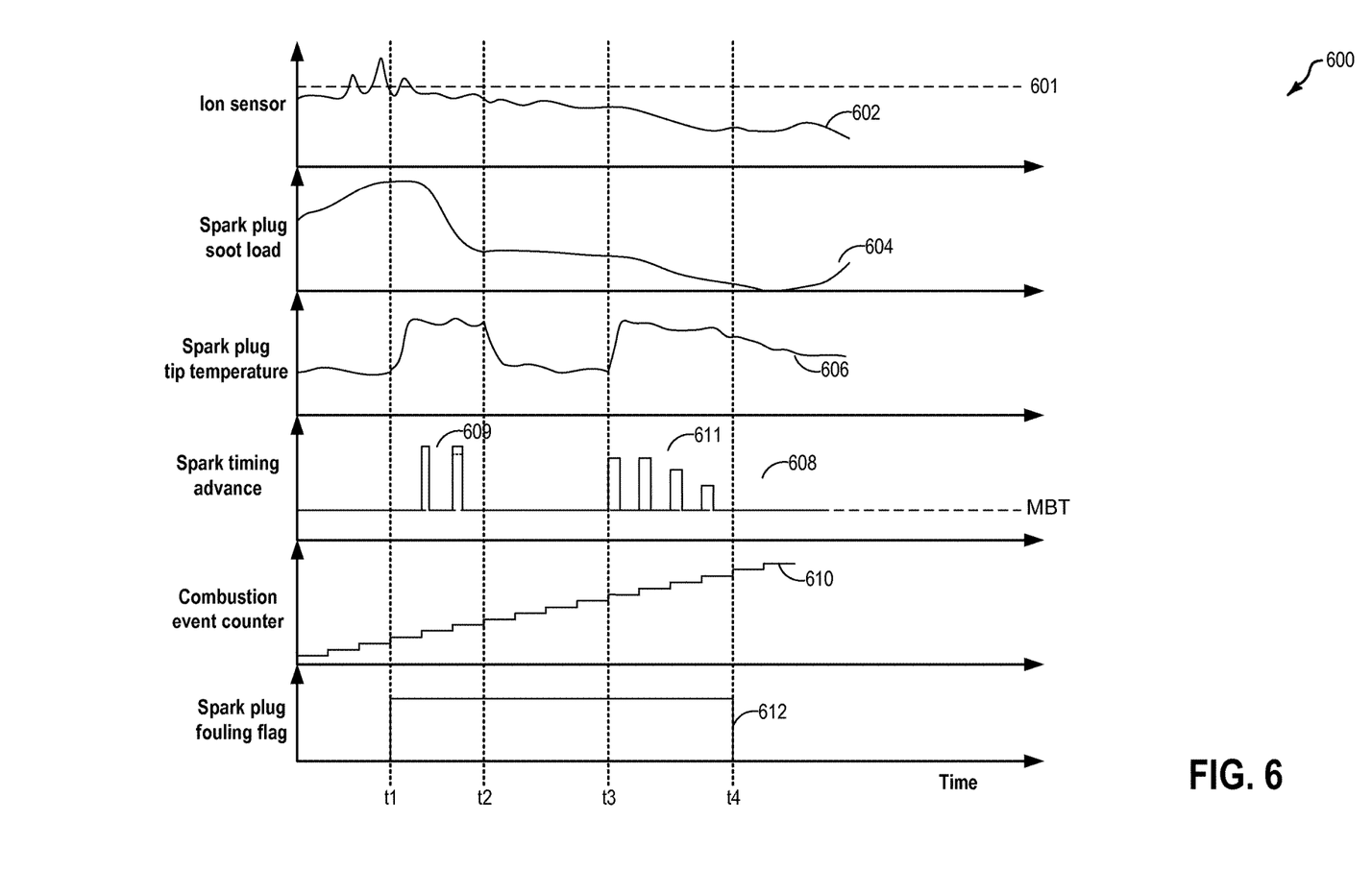

Turning now to FIG. 6, an example spark timing adjustment responsive to an indication of spark plug fouling in a cylinder is shown at map 600. Map 600 depicts the output of an ionization sensor at plot 602, a spark plug soot load at plot 604, spark plug tip temperature at plot 606, spark plug timing at plot 608, a combustion event counter at plot 610, and a spark plug fouling flag at plot 612. It will be appreciated that all parameters are shown for a given cylinder. In other words, the spark plug tip temperature, soot load, and flag are for a given cylinder. Likewise, the combustion event counter is shown counting sequential combustion events in the given cylinder. It will be appreciated that the origin of the graph (where the x and y axes intersect) represents a time t0.

Before t0, the given cylinder's spark plug is not fouled, and no flag is set. Between t0 and t1, as combustion progresses in the cylinder, soot may gradually accumulate on the spark plug of the cylinder. Around (e.g., just before) t1, the soot load on the spark plug may be significantly high (plot 604) such that the pre-dwell output of an ionization sensor (plot 602) increases above a potential misfire threshold 601. In this way, a controller may address potential misfire conditions even before they happen. In response to the elevated pre-dwelt ionization sensor output, a potential cylinder misfire event may be indicated and further any cylinder misfire may be attributed to spark plug soot fouling of the given cylinder. Accordingly, a spark plug soot fouling flag may be set at t1 (plot 612).

In response to the indication of spark plug soot fouling, for at least a single cylinder combustion event after t1, the affected cylinder may be supplied with a first advanced spark timing 609. In the depicted example, the first advanced spark timing is supplied for two combustion events. The first advanced spark timing supplied on the second combustion event may be the same as or slightly lower than the first advanced spark timing supplied on the first combustion event. By supplying the first advanced spark timing, the spark plug tip temperature may be raised enough to burn off at least a portion of the soot accumulated on the fouled spark plug. By t2, the spark plug tip temperature may be high such that knock may be induced.

Thus at t2, after supplying the first advanced spark timing, the affected cylinder may be supplied with nominal spark timing for a number of combustion events to control the spark plug tip temperature. In the present example, nominal spark timing is provided for 4 combustion events in the affected cylinder, from t2 to t3.

At t3, once the spark plug tip temperature has been controlled, spark timing advance is supplied again to burn off the remaining soot. In the present example, in response to an improvement in the condition of the fouled spark plug following the supplying of the first advanced spark timing, the second advanced spark timing is adjusted to have a lower degree of spark advance and to be supplied for a smaller number of combustion events. As shown, the second advanced spark timing 611 is supplied over 4 combustion events. Further, the second advanced spark timing is supplied at the same level for a portion of the 4 combustion events (for the first two events) and then progressively decreased. It will be appreciated that second advanced spark timing 611 is less advanced than first advanced spark timing 609.

Between t3 and t4, as the second advanced spark timing is supplied, the remaining soot load is burned off such that at t4, the spark plug is determined to be clean. At t4, in response to the spark plug being determined to be clean, the spark plug fouling flag is removed.

Figure 7:
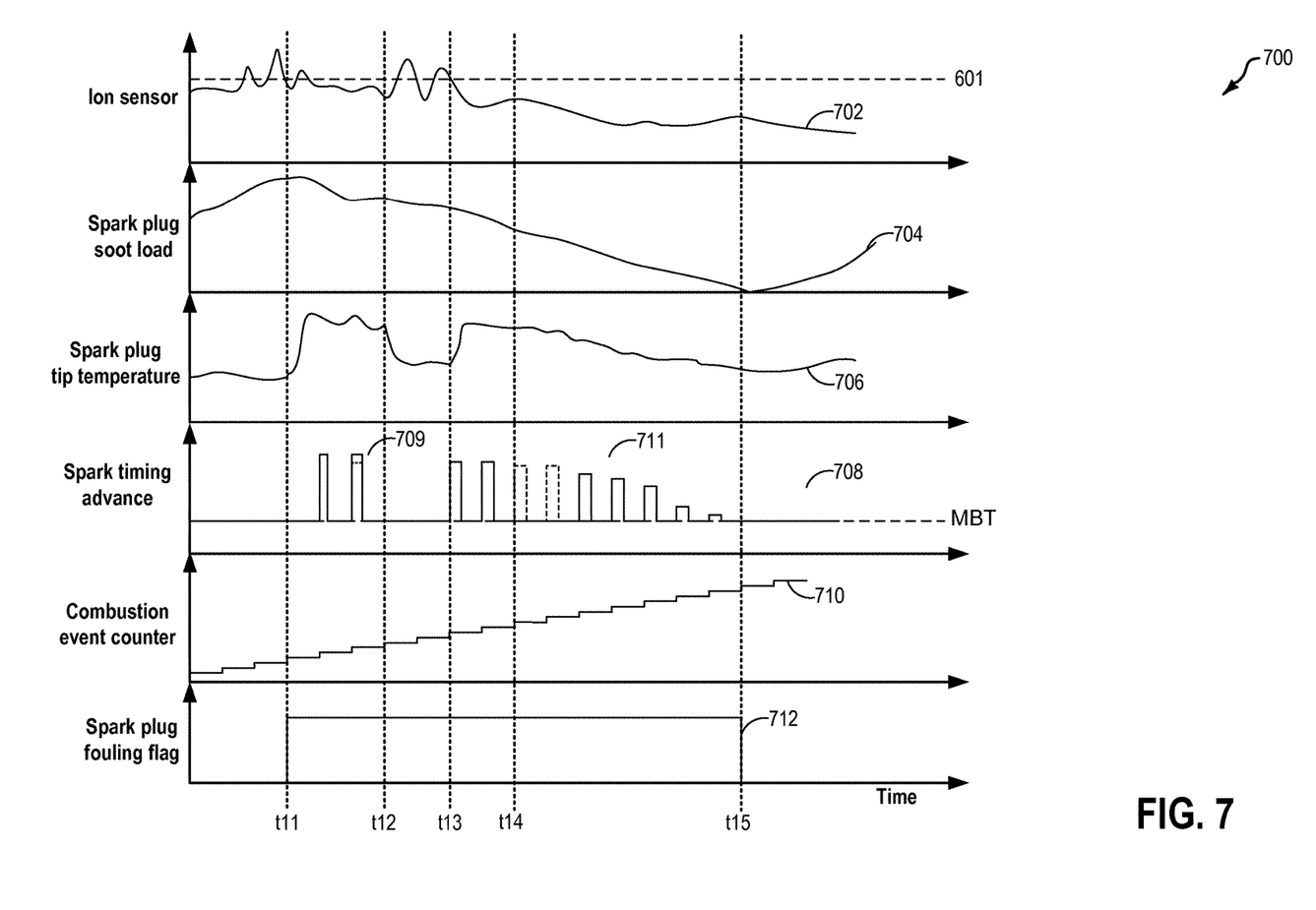

Turning now to FIG. 7, another example spark timing adjustment responsive to an indication of spark plug fouling in a cylinder is shown at map 700. Map 700 depicts the output of an ionization sensor at plot 702, a spark plug soot load at plot 704, spark plug tip temperature at plot 706, spark plug timing at plot 708, a combustion event counter at plot 710, and a spark plug fouling flag at plot 712. It will be appreciated that all parameters are shown for a given cylinder. In other words, the spark plug tip temperature, soot load, and flag are for a given cylinder. Likewise, the combustion event counter is shown counting sequential combustion events in the given cylinder. It will be appreciated that the origin of the graph (where the x and y axes intersect) represents a time t0.

Before to, the given cylinder's spark plug is not fouled, and no flag is set. Between t0 and t11, as combustion progresses in the cylinder, soot may gradually accumulate on the spark plug of the cylinder. Around (e.g., just before) t11, the soot load on the spark plug may be significantly high (plot 704) such that the pre-dwell output of an ionization sensor (plot 702) increases above a misfire threshold 701. In response to the elevated pre-dwelt ionization sensor output, a potential cylinder misfire event may be indicated and further any cylinder misfire may be attributed to spark plug soot fouling of the given cylinder. Accordingly, a spark plug soot fouling flag may be set at t11 (plot 712).

In response to the indication of spark plug soot fouling, for at least a single cylinder combustion event after t11, the affected cylinder may be supplied with a first advanced spark timing 709. In the depicted example, as at FIG. 6, the first advanced spark timing is supplied for two combustion events. The first advanced spark timing supplied on the second combustion event may be the same as or slightly tower than the first advanced spark timing supplied on the first combustion event. By supplying the first advanced spark timing, the spark plug tip temperature may be raised enough to burn off at least a portion of the soot accumulated on the fouled spark plug. By t12, the spark plug tip temperature may be high such that knock may be induced.

Thus at t12, after supplying the first advanced spark timing, it may be determined that the affected cylinder is to be supplied with nominal spark timing for a number of combustion events to control the spark plug tip temperature. In the present example, nominal spark timing is to be provided for 4 combustion events in the affected cylinder.

However, while or after supplying nominal spark timing for 2 combustion events (from t12 to t13), ion sensor output may once again increase above threshold 601 indicating further cylinder misfire and insufficient improvement in the condition of the fouled spark plug. Accordingly, at t13, supplying of nominal spark timing is stopped (that is, the duration of supplying nominal spark timing is reduced), and a second advanced spark timing is supplied. Specifically, the second advanced spark timing 711 is supplied for a longer duration in response to the ion sensor output. In the depicted example, the second advanced spark timing is supplied from t13 to t14, and then further extended from t14 to t15. Further, the second advanced spark timing is supplied at the same level for a duration that may be adjusted based on the ion sensor output (for example, extended for another 2 combustion events as indicated by dotted bars and then progressively decreased. It will be appreciated that second advanced spark liming 711 is less advanced than first advanced spark timing 709.

Between t13 and t15, as the second advanced spark timing is supplied, the remaining soot load is burned off such that at t15, the spark plug is determined to be clean. At US, in response to the spark plug being determined to be clean, the spark plug fouling flag is removed.

In this way, the degree of advance of the second advanced spark timing as well as a duration of supplying the second advanced spark timing is adjusted, in eat-time, based on spark plug parameters following the supplying of the first advanced spark timing.

In one example, an ignition control method comprises: supplying a first advanced spark timing to a cylinder for a first single combustion event; supplying a nominal spark timing to the cylinder for a number of combustion events after supplying the first advanced spark timing to the cylinder; and supplying a second advanced spark timing to the cylinder for a second single combustion event after the number of combustion events. In the preceding example, the second advanced spark timing may, additionally or optionally, be less advanced than the first advanced spark timing. In any of the preceding examples, the supplying may additionally or optionally be performed responsive to an indication of spark plug fouling due to soot accumulation. In any of the preceding examples, the nominal spark timing may be additionally or optionally supplied for a first number of combustion events, the method further comprising, supplying the second advanced spark timing to the cylinder for a second number of combustion events. In any or all of the preceding examples, the first advanced timing and the first number of combustion events may be additionally or optionally based on one or more of an ionization sensor output, aircharge temperature, spark plug tip temperature and engine temperature. In any of the preceding examples, the second advanced timing and the second number of combustion events may be additionally or optionally adjusted based on one or more of ionization sensor output, aircharge temperature, spark plug tip temperature and engine temperature following the supplying of the first advanced spark timing and the supplying of the nominal spark timing. Further, in any or all of the preceding examples, one or more of a degree of spark advance of the second advanced timing and the second number of combustion events may be additionally or optionally increased in response to an indication of knock. Further, a degree of spark advance of the second advanced spark timing may be additionally or optionally progressively decreased as the second number of combustion events increases. In any of the preceding example methods, the method may additionally or optionally further comprise advancing spark timing for one or more combustion events after the first single combustion event, the one or more combustion cycles based on spark plug tip temperature. Further, in any or all of the preceding examples, each of the first and second advanced spark timings may be advanced from the nominal spark timing, and the nominal spark timing may additionally or optionally include spark timing at MBT, or borderline timing (BDL).

In another example, an example engine ignition control method comprises: responsive to an indication of fouling of a spark plug, periodically advancing spark timing from a nominal spark timing, a degree of advance and a periodicity of the advanced spark timing based on one of more of an ionization sensor output, aircharge temperature, spark plug tip temperature and engine temperature. In the preceding example, the degree of advance and the periodicity of the advanced spark timing may be additionally or optionally further based on an indication of cylinder knock. In any or all of the preceding examples, the periodically advancing may additionally or optionally include advancing spark timing by a first amount for a first number of combustion events, then returning spark timing to nominal spark timing for a second number of combustion events, and then advancing spark timing by a second amount for a third number of combustion events. In any or all of the preceding examples, the first amount of spark advance and the first number of combustion events may be additionally or optionally based on the indication of spark plug fouling, while the second amount of spark advance and each of the second and third number of combustion events is adjusted in real-time based on one or more of the ionization sensor output, aircharge temperature, spark plug tip temperature and engine temperature following the advancing spark timing by the first amount for the first number of combustion events. In any or all of the preceding examples, the degree of advance may be additionally or optionally increased and an interval between consecutive periods of operating with advanced spark timing may be additionally or optionally decreased as one or more of the an ionization sensor output, aircharge temperature, spark plug tip temperature and engine temperature increases. In each or all of the preceding examples, the indication of fouling may additionally or optionally include an indication of soot accumulation on the spark plug. In addition, any or all of the example methods may additionally or optionally further comprise, in response to an indication that the park plug is clean, discontinuing the periodically advancing spark timing.

In another example, an engine system comprises: an engine cylinder, a spark plug for initiating combustion in the engine cylinder, an ion sensor coupled to the spark plug, and a controller configured with computer readable instructions stored on non-transitory memory for: indicating spark plug soot fouling based on an output of the ion sensor; and in response to the indication: supplying a first advanced spark timing to the engine cylinder for one or more combustion events; then supplying a nominal spark timing to the engine cylinder for a predetermined number of combustion events; and then supplying a second advanced spark timing to the engine cylinder for one or more combustion events after the predetermined number of combustion events, the second advanced spark timing adjusted based on ion sensor output estimated after supplying the first advanced spark timing. In the preceding example, the second advanced spark timing may additionally or optionally be less advanced than the first advanced spark timing, each of the first and second advanced spark timing advanced from the nominal timing. In any or all of the preceding examples, the controller may additionally or optionally include further instructions for: adjusting the predetermined number of combustion events based on a spark plug tip temperature, the number increased as the spark plug tip temperature increases. In any or all of the preceding examples, the ion sensor output estimated after supplying the first advanced spark timing may be additionally or optionally indicative of a soot load of the fouled spark plug, and in response to the soot load being above a clean threshold, the second advanced spark timing may be additionally or optionally advanced further from the nominal timing and a number of combustion events over which the second advanced spark timing is supplied is increased, and in response to the soot load being at or below the clean threshold, the second advanced spark timing may be advanced lesser from the nominal timing and a number of combustion events over which the second advanced spark timing is supplied may be decreased.

In this way, spark plug fouling may be addressed using spark advance without overheating a spark plug. By spacing the spark timing advance supplied to a cylinder, soot accumulated on a fouled spark plug may be burned off. By using nominal spark in between bursts of spark advance, spark plug tip temperatures may be maintained hot enough to burn off the soot without overheating and causing issues such as knock, NVH, and durability issues. By improving the engine's knock margin, fuel economy is improved. By better controlling spark plug fouling, cylinder misfire occurrence is reduced. Overall, spark plug life can be extended.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An ignition control method, comprising:
supplying a first advanced spark timing to a cylinder for a first single combustion event;
supplying a nominal spark timing to the cylinder for a first number of combustion events after supplying the first advanced spark timing to the cylinder; and
supplying a second advanced spark timing to the cylinder for a second single combustion event after the first number of combustion events,
wherein the nominal spark timing is supplied for a first number of combustion events, and the method further comprising, supplying the second advanced spark timing to the cylinder for a second number of combustion events, and
wherein the first advanced timing and the first number of combustion events is based on one or more of an ionization sensor output, aircharge temperature, spark plug tip temperature, engine load, fuel octane, air-fuel ratio, humidity, EGR percentage, and engine temperature.

2. The method of claim 1, wherein the second advanced spark timing is less advanced than the first advanced spark timing.

3. The method of claim 1, wherein the supplying is performed responsive to an indication of spark plug fouling due to soot accumulation.

4. The method of claim 1, wherein the second advanced timing and the second number of combustion events is adjusted based on one or more of the ionization sensor output, aircharge temperature, spark plug tip temperature, engine load, fuel octane, EGR percentage, air-fuel ratio, humidity, and engine temperature following the supplying of the first advanced spark timing and the supplying of the nominal spark timing.

5. The method of claim 4, wherein one or more of a degree of spark advance of the second advanced timing and the second number of combustion events is decreased in response to an indication of knock.

6. The method of claim 1, wherein a degree of spark advance of the second advanced spark timing is progressively decreased as the second number of combustion events increases.

7. The method of claim 1, further comprising advancing spark timing for one or more combustion events after the first single combustion event, the one or more combustion cycles based on spark plug tip temperature.

8. The method of claim 1, wherein each of the first and second advanced spark timings are advanced from the nominal spark timing, and wherein the nominal spark timing includes one of spark timing at MBT and borderline spark timing.

9. An engine ignition control method, comprising:
responsive to an indication of fouling of a spark plug, periodically advancing spark timing from a nominal spark timing, a degree of advance, and a periodicity of the advanced spark timing based on one of more of an ionization sensor output, aircharge temperature, spark plug tip temperature, EGR, fuel octane, engine load, and engine temperature.

10. The method of claim 9, wherein the degree of advance and the periodicity of the advanced spark timing is further based on an indication of cylinder knock.

11. The method of claim 9, wherein the periodically advancing includes advancing spark timing by a first amount for a first number of combustion events, then returning spark timing to the nominal spark timing for a second number of combustion events, and then advancing spark timing by a second amount for a third number of combustion events.

12. The method of claim 11, wherein the first amount of spark advance and the first number of combustion events is based on the indication of spark plug fouling, and wherein the second amount of spark advance and each of the second and third number of combustion events is adjusted in real-time based on one or more of the ionization sensor output, aircharge temperature, spark plug tip temperature, and engine temperature following the advancing spark timing by the first amount for the first number of combustion events.

13. The method of claim 9, wherein the degree of advance is increased and an interval between consecutive periods of operating with advanced spark timing is decreased as one or more of the ionization sensor output, aircharge temperature, spark plug tip temperature, and engine temperature increases.

14. The method of claim 9, wherein the indication of fouling includes an indication of soot accumulation on the spark plug, the method further comprising, in response to an indication that the spark plug is clean, discontinuing the periodically advancing spark timing.

15. An engine system, comprising:
an engine cylinder,
a spark plug for initiating combustion in the engine cylinder,
an ion sensor coupled to the spark plug, and
a controller configured with computer readable instructions stored on non-transitory memory for:
indicating spark plug soot fouling based on an output of the ion sensor; and
in response to the indication:
supplying a first advanced spark timing to the engine cylinder for one or more combustion events;
then supplying a nominal spark timing to the engine cylinder for a predetermined number of combustion events; and
then supplying a second advanced spark timing to the engine cylinder for one or more combustion events after the predetermined number of combustion events, the second advanced spark timing adjusted based on ion sensor output estimated after supplying the first advanced spark timing.

16. The system of claim 15, wherein the second advanced spark timing is less advanced than the first advanced spark timing, each of the first and second advanced spark timing advanced from the nominal spark timing.

17. The method system claim 16, wherein the controller includes further instructions for: adjusting the predetermined number of combustion events based on a spark plug tip temperature, the predetermined number decreased as the spark plug tip temperature increases.

18. The system of claim 16, wherein the ion sensor output estimated after supplying the first advanced spark timing is indicative of a soot load of the fouled spark plug, and wherein in response to the soot load being above a clean threshold, the second advanced spark timing is advanced further from the nominal timing and a number of combustion events over which the second advanced spark timing is supplied is increased, and wherein in response to the soot load being at or below the clean threshold, the second advanced spark timing is advanced lesser from the nominal timing and the number of combustion events over which the second advanced spark timing is supplied is decreased.

* * * * *